United States Patent Office 3,419,961
Patented Jan. 7, 1969

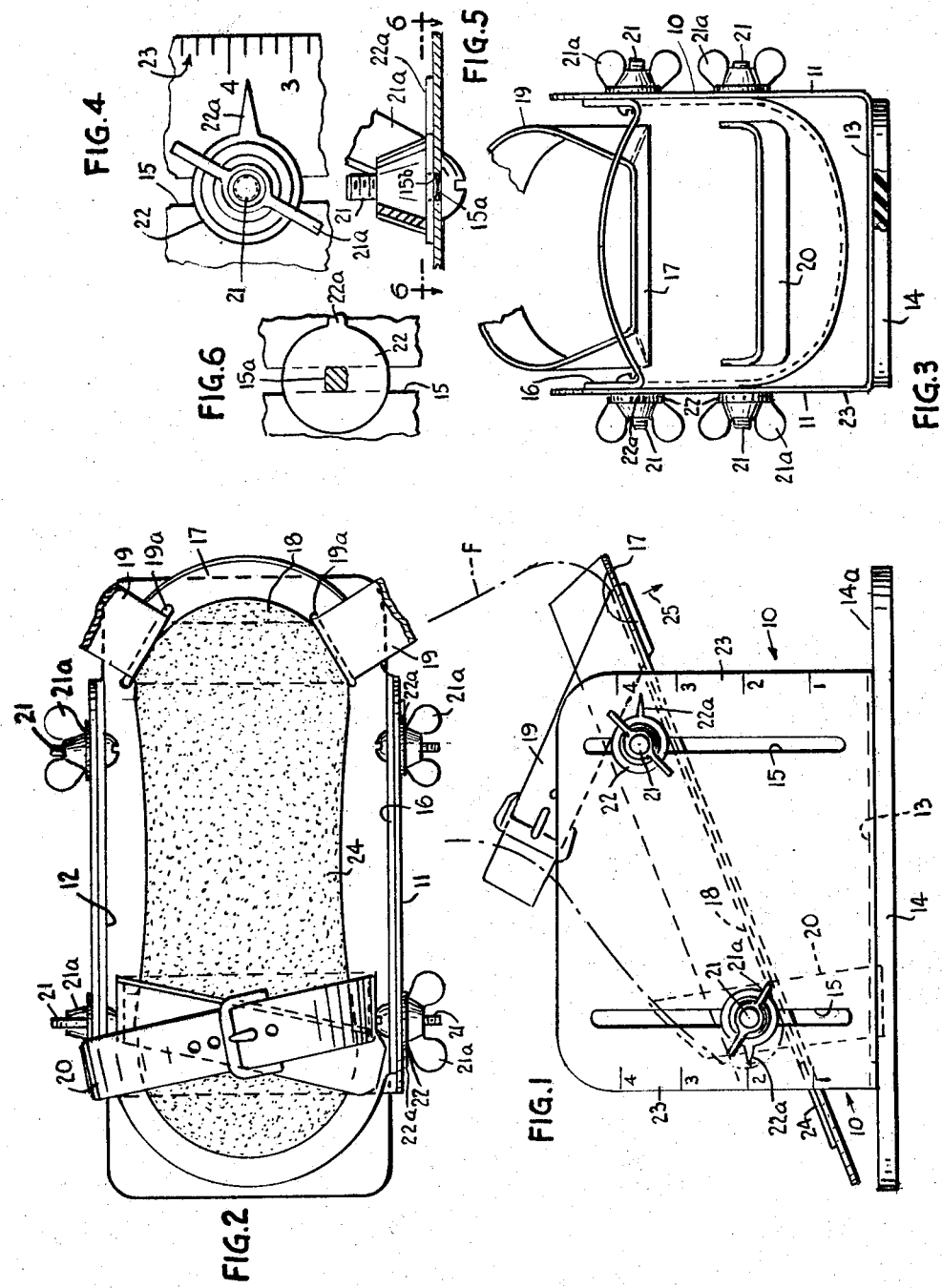

3,419,961
MEASURING DEVICE FOR ORTHOPEDIC SHOES
Alfred Benesch, 25 Nagle Ave.,
New York, N.Y. 10040
Filed June 9, 1966, Ser. No. 556,431
U.S. Cl. 33—3                                3 Claims
Int. Cl. A43d 1/02

ABSTRACT OF THE DISCLOSURE

The present invention has for its purpose the provision of a device to measure the amount of elevation required in the construction of an orthopedic shoe. To this end a measuring device is provided having a housing terminating at one end in a fixed base and having a pair of spaced-apart parallel walls at opposite edges of the base. A platform for a foot is retained between the walls, the platform being vertically movable with respect to the fixed base and adjustably retainable in any desired elevational position, the distance between the platform and the fixed base indicating the amount of elevation required.

---

This invention relates broadly to measuring devices, and it has more specific reference to the provision of an adjustable device to determine the amount of elevation required in a shoe to compensate for the difference in the length of a wearer's legs.

Many people have legs of uneven length. This condition may be prenatal in origin, or it may be the result of illness or accident. Further, it becomes necessary at times for a leg to be placed in a cast, making the legs of the person so treated functionally uneven in length.

Under such circumstances the persons so handicapped generally engages the services of an orthopedist, a brace technician or an orthopedic shoe technician. A specially constructed shoe is commonly recommended for the shorter leg, which is "built up" to make the length of the legs functionally even. Crude methods are presently used to determine the required amount of elevation. Some specialists place a book under the foot of the shorter leg, while others use a block or blocks. This method is both primitive and unscientific.

With this in view, it is the principal object of the present invention to provide a measuring device for this purpose, the said device having a fixed base and a foot receiving platform which is vertically adjustable with respect to the fixed base, the distance between the platform and the base constituting the required amount of elevation.

A further aim of the present invention resides in the provision of a device of this character, wherein the platform can be retained instantly in an adjusted position until reset.

And a still further advantage of the present invention lies in the provision of a device of this character, which may be attached to the foot of a patient so that he can walk with the device, thus enabling the practitioner to observe the posture of the patient to determine the complete accuracy of the adjustment.

These and other meritorious aims and advantages of the present invention are attained by the novel construction, combination and arrangement of parts, hereinafter described and illustrated in the accompanying drawing, constituting a material component of the present disclosure, and in which:

FIGURE 1 is a front elevational view of a measuring device constructed in accordance with the present invention.

FIGURE 2 is a top plan view of the invention illustrated in FIGURE 1.

FIGURE 3 is a right hand view of the device which constitutes the subject-matter of the present disclosure.

FIGURE 4 is a fragmentary detail view of the platform retaining means and measuring scale.

FIGURE 5 is a front view of the section illustrated in FIGURE 4.

FIGURE 6 is a sectional view, the section being taken on line 6—6 of FIGURE 5.

Referring in greater detail to the drawing, the numeral 10 refers broadly to an embodiment of the present invention, which comprises a fixed base 13 having a pair of parallel spaced-apart walls 11 and 12 extending from opposite edges thereof. Walls 11 and 12 and base member 13 are illustrated as being formed from a unitary piece of material such as steel or any other suitable and desirable material, but they may be made of three separate elements, joined in any suitable and desirable manner. The underside of base 13 may have a rubber plate 14 secured thereto for a purpose which will presently become more fully apparent.

Each of the said walls 12 and 13 is provided with a pair of spaced-apart parallel, vertically extending slots 15, the slots being pair-wise arranged.

The invention further comprises a platform 17, illustrated as having substantially the contour of the sole of a human foot. At its opposite longitudinal edges, platform 17 is turned perpendicularly to form a pair of flanges 16, for a purpose which will hereinafter be more fully explained. The central area of platform 17 may be provided with a resilient cushion 18.

Platform 17 is provided with a pair of spaced-apart slots 19a near its toe section and a pair of similar slots 19a near its heel section. Each pair of slots 19a has retained therein a strap, respectively referred to by the numerals 19 and 20. Strap 20 near the toe section of the platform 17 may be provided with a buckle 26.

Each of the said flanges 16 are provided with a pair of openings, each of the said openings in alignment with one of the said slots 15. The invention contemplates the use of four bolts 21, one for each of the openings in flanges 16. Each of said bolts 21 terminates at one end in a head which, when the device is assembled abuts the inner face of the wall of one of said flanges 16 as is illustrated in FIGURE 1 of the drawing. The other end of each of the said bolts 21 is externally threaded, for engagement with internally threaded wing nuts 21a. A washer 22 is positioned between each wing nut and each bolt.

The device, which is the subject matter of the present application is used in the following manner:

When a patient requires a shoe which is elevated to compensate for a shorter leg, the orthopedist will request that he place the foot of the shorter leg on the platform 17 of the present device. The orthopedist will then raise or lower the platform with respect to the fixed base by loosening the wing nuts in an obvious manner and slide the bolts 21 and the platform with which they are engaged either upward or downward in slots 15 until the desired distance between the platform and the fixed base has been obtained. When he has achieved the desired elevation, he will tighten the nuts to retain the bolts and the platform in adjusted position. Scales 23 are provided as an integral part of the walls. He can at a glance determine the distance between the platform and the base.

When the device is assembled, the threaded ends of the bolts 21 will extend through the openings in flanges 16 and through slots 15 so that they are free to have the wing nuts secured thereto.

The patient will place his foot into the straps 19 and 20 in order to secure the device to his foot. Strap 20 may, if desired, be provided with a buckle, so that the device may be securely attached to the foot. The patient will now be able to walk with the adjusted device so that the orthopedist will be able to determine whether the desired amount of elevation has been achieved, and he may also be able to observe the posture of the person. In this fashion the orthopedist may find that further adjustment of the form is indicated. The cushion 14 on the under side of the base member is provided, so that the patient can walk easily and without noise.

In FIGURE 4 the washer 22 is shown as having a square opening 15a, so that indicator 22a will point to the exact position of the platform.

There has thus been shown and described a device to measure and evaluate the precise amount of elevation required in the construction of a shoe to compensate for the diffrence in the length of a person's legs in the preferred form of its embodiment. It is to be understood that the foregoing is to be regarded as illustrative and descriptive only of the best known form of the present invention and not as restrictive or limitative to the exact details shown, applicant reserving the right to make such changes and modifications in the construction of the device.

Having thus described the invention, what is claimed as new, and desired to secure by Letters Patent, is:

1. A device to determine the amount of elevation required in the construction of an orthopedic shoe for a special purpose, said device comprising a housing, said housing having a fixed horizontally disposed base, a pair of parallel perpendicular walls extending from opposite edges of said base, a pair of spaced-apart vertical slots in each of said walls, a foot receiving platform between said walls, a pair of flanges extending from opposite edges of said platform, support means for said platform, passageways through said flanges in alignment with said vertical slots, said support means passing in part into, through and out of said passageways and into, through and out of said slots retaining said platform in vertically adjustable engagement between said walls, the distance between said vertically movable platform and said fixed base adapted to be selectively altered and means engaging said support means removably retaining said support means and said platform in adjusted position.

2. A device for the purpose defined, said device comprising a horizontally disposed fixed base, a pair of spaced apart walls at opposite edges of said base, a foot receiving platform between said walls, said platform bent perpendicularly at opposite edges thereof providing a pair of spaced-apart parallel flanges, a plurality of openings in said flanges said openings in alignment with said slots in said walls, support means for said platform, said support means passing in part through said openings and said slots retaining said support means and said platform in slidable engagement between aid walls, and means engaging said support means removably retaining said support means and said platform in adjusted position.

3. A device of the character described comprising a housing, said housing having a fixed horizontally disposed base, said base curved at opposite edges thereof forming a pair of perpendicularly disposed parallel walls, a pair of pair-wise arranged vertical solts in each of said walls, a horizontally disposed foot-receiving platform between said walls, said platform having a pair of parallel perpendicularly disposed flanges at opposite edges thereof, said flanges abutting said walls, a pair of spaced-apart openings in each of said flanges, said openings in alignment with said slots, a plurality of support means for each of said flanges, said support means movably supporting said platform between said walls, said support means passing in part into, through and out of said openings in said flanges, and into, through and out of said slots retaining said platform in vertically movable engagement between said walls, and means engaging said support means removably retaining said support means and said platform in adjusted position.

References Cited
UNITED STATES PATENTS

| | | | |
|---|---|---|---|
| 1,078,962 | 11/1913 | Schmid | 272—70.1 |
| 2,009,875 | 7/1935 | Clausing | 33—3.2 |
| 2,312,410 | 3/1943 | Hewitt | 33—3.2 |
| 2,441,511 | 5/1948 | Ross | 33—3.2 |
| 2,747,300 | 5/1956 | Field. | |

SAMUEL S. MATTHEWS, *Primary Examiner.*